US008209901B2

(12) United States Patent
Van Adrichem

(10) Patent No.: US 8,209,901 B2
(45) Date of Patent: *Jul. 3, 2012

(54) ADMINISTERING SUBSTANCES TO PLANTS BY INJECTION

(75) Inventor: John Van Adrichem, De Lier (NL)

(73) Assignee: Precision Drip B.V., De Lier (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/049,196

(22) Filed: Mar. 16, 2011

(65) Prior Publication Data

US 2011/0162267 A1 Jul. 7, 2011

Related U.S. Application Data

(60) Division of application No. 12/394,902, filed on Feb. 27, 2009, now Pat. No. 7,913,450, which is a continuation-in-part of application No. PCT/EP2007/007584, filed on Aug. 30, 2007.

(30) Foreign Application Priority Data

Aug. 30, 2006 (NL) ..................................... 1032384

(51) Int. Cl.
*A01G 13/00* (2006.01)
(52) U.S. Cl. ...................................................... 47/57.5

(58) Field of Classification Search ................... 47/57.5, 47/57.7
See application file for complete search history.

(56) References Cited

U.S. PATENT DOCUMENTS

| 3,091,197 | A | 5/1963 | Henry |
| 6,820,367 | B2 | 11/2004 | Poirier et al. |
| 6,834,461 | B2 | 12/2004 | Poirier et al. |
| 7,913,450 | B2 * | 3/2011 | Van Adrichem ............... 47/57.7 |
| 2004/0049974 | A1 | 3/2004 | Poirier et al. |
| 2009/0241414 | A1 | 10/2009 | Van Adrichem |
| 2011/0162267 | A1 * | 7/2011 | Van Adrichem ............... 47/57.5 |

FOREIGN PATENT DOCUMENTS

GB 2058532 4/1981
* cited by examiner

*Primary Examiner* — Frank T Palo
(74) *Attorney, Agent, or Firm* — Vedder Pric P.C.; Thomas J. Kowalski; Deborah L. Lu

(57) ABSTRACT

The invention relates to a method and device for administering at least one substance to a plant or plant material, comprising of: (i) providing at least one substrate with a surface and at least one plant location therein; (ii) providing injecting means; (iii) moving the substrate and the injection means relative to each other; (iv) controlling an alignment of the injecting means relative to the plant location; and (v) injecting the substance of the position of the plant location using the injecting means.

24 Claims, 2 Drawing Sheets

ADMINISTERING SUBSTANCES TO PLANTS BY INJECTION

This application is a divisional of U.S. application Ser. No. 12/394,902, filed Feb. 27, 2009, now U.S. Pat. No. 7,913,450, which is a continuation-in-part of International Patent Application Serial No. PCT/EP2007/007584 filed 30 Aug. 2007 which published as PCT Publication No. WO 2008/025548 on 6 Mar. 2008 which claims the benefit of priority to Dutch Patent Application Serial No. 1032384 filed 30 Aug. 2006.

The present invention relates to a method and a device for administering at least one substance to or close to plant material, such as for instance seeds, seedlings, cuttings and plants.

It is known to administer the substances at plant locations by spraying onto plants or onto the ground (a substrate) for the plant material which can be or are set or planted therein.

This involves considerable loss of treatment agent. Administering onto a plant has a low efficiency; in order to be at all effective a large quantity must be administered. Administering from a distance on the substrate—spraying, dripping or depositing—may result in the treatment agent coming to lie at an unintended location other than a plant location. Leaves can moreover then get in the way if there are already plants growing in or on the ground. In this respect it is noted that in known techniques dosaging at the plant location usually occurs with insufficient accuracy.

By injecting, according to the invention, substances such as crop protection agents, growth enhancers and root hormones under the surface, these agents are administered in a manner which achieves a maximum effect of said agents. In addition, fungicides, insecticides, herbicides, nematocides and so on can be applied. It is hereby also possible to effectively avoid harmful contamination occurring on the surface or on the plant itself. Very precise positioning and moreover dosaging of the substances or the treatment agent at the plant location can thus be guaranteed.

This injection can be used as soon as the exact "plant location" is determined. This is for instance the case immediately after pressing of so-called "soil blocks" or immediately after filling of a so-called tray with substrate, i.e. before the plant, cutting or seedling or the seed is present at this "plant location". Other examples of fields of application of the invention are rockwool pots, coco-pots, pre-filled paper pots etc. The invention also provides a solution after the plant material has arrived at the plant location and may even have been growing for a time.

It is noted that the injection of for instance fertilizers is known, but that the relating of injection of treatment agent to an exact plant location is a very relevant feature of the present invention. When fertilizers are injected exact dosaging is also a much less relevant factor; a quantity of fertilizer must be distributed evenly over a substrate or meadow, without any concern about administering dosed quantities per plant location, this in contrast to the present invention.

Administering exact determined quantities of substance or treatment agent per plant location can also be considerably improved with the invention relative to depositing substances or treatment agents and seeds at a plant location, because no drift of substances or treatment agents and seeds can occur, for instance on an air current, and because of the inherently more accurate dosing possibilities of injection. It is moreover possible to prevent vapour formation, which is temperature-dependent and difficult to predict, as a result of which vapour formation a quantity of substance, or in particular liquid treatment agent, actually coming to lie at the plant location could turn out to be lower than intended.

The invention has many possible embodiments, some of which are defined in the dependent claims.

As already noted, the present invention also relates to a device for implementing the method according to the present invention.

An exemplary embodiment of the present invention will be described hereinbelow with reference to the accompanying drawings, in which similar or the same components and elements are designated with the same reference numerals, also in views of mutually differing embodiments, and in which.

Figure 1:
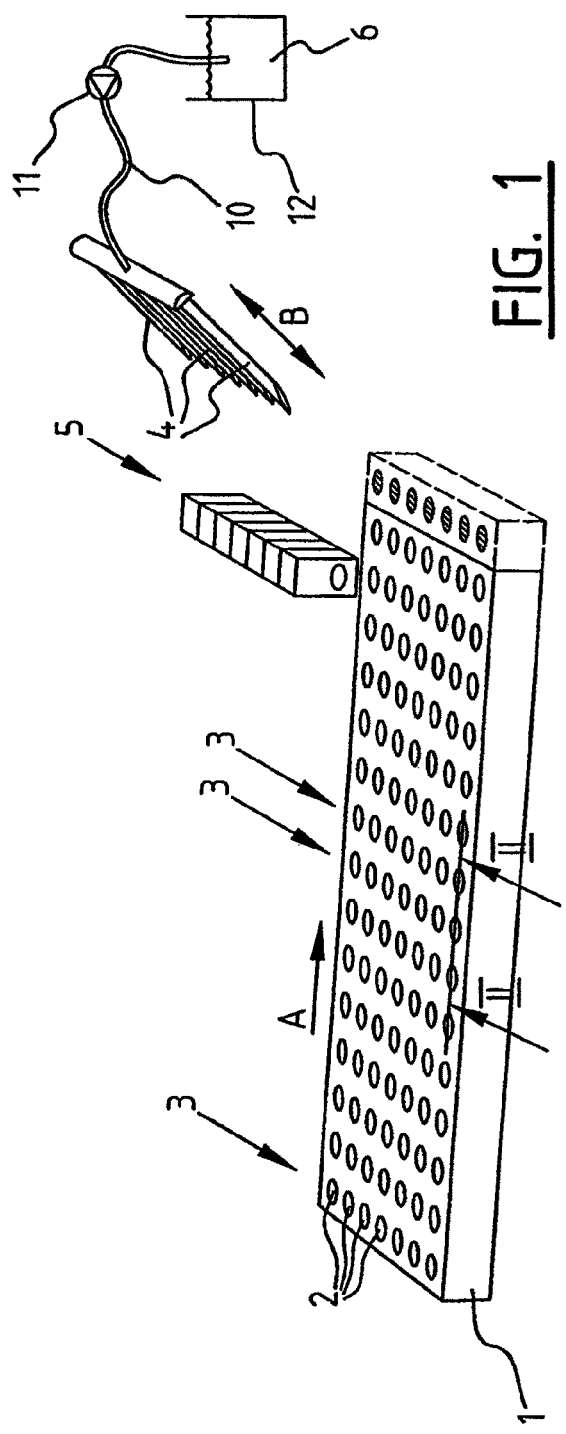
FIG. 1 shows schematically a perspective view of an embodiment of the present invention.

FIG. 1 shows a tray 1. Tray 1 is manufactured from synthetic material, such as plastic, styropor or any other suitable material. Plant locations 2 are defined in the surface of tray 1. Tray 1 comprises cavities 8 at the plant locations, which are filled with substrate material, such as rockwool, soil, clay, potting compost, coconut fibre and so on for forming plugs 9. More precisely, recesses in plugs 9 define plant locations 2. After the initial growth phase of a seed, seedling, cutting or plant and when it has developed sufficiently, these plugs can be taken out of tray 1 and placed in a substrate block (not shown) or other substrate.

Plant locations 2 are arranged in the surface of tray 1 in rows 3 with seven plant locations per row 3 in the exemplary embodiment shown here in FIG. 1.

Further shown in FIG. 1 are injectors 4 for substances in the form of liquid treatment agent 6 and release elements 5 for seeds. It will be apparent that, in addition to or as alternative to droplets of treatment agent 6, treatment agent in grain or powder form can also be used. The injectors are connected via conduits 10 having a pump 11 therein to a reservoir 12 for treatment agent 6.

The tray 1 is displaced with plugs 9 in tray 1 at plant locations 2 by transport means (not shown) in the direction of arrow A relative to injectors 4 and release elements 5, which are per se stationary and form part of a device for implementing the method according to the present invention. It is noted that such a device, of which only injectors 4 and release elements 5 are shown here in FIG. 1, can take a mobile form. Substrates 1 do not herein pass below injectors 4 and release elements 5, but injectors 4 and release elements 5 can themselves be disposed for travel on a frame and displaced or pulled across a field, or the open ground, or other stationary substrate. Such a solution can then for instance also provide for levelling of the ground and the forming of holes therein corresponding to plant locations 2 as they are shown in FIG. 1.

It is possible for the movement of tray 1 under injectors 4 and release elements 5 to be uninterrupted. This is possible if injectors 4 can inject treatment agent 6 with sufficient speed in, under or close to the plant location. The control of the release elements then requires great precision; treatment agent 6 and seed 7 must always come to lie in, on or close to a plant location. As alternative an embodiment can comprise the measure that the movement of the tray in the direction of arrow A progresses intermittently, and is interrupted if injectors 4 are directed in desired manner at plant locations 2 to effectively enable treatment agent 6 to be injected in or under plant locations 2 and to also deposit a seed 7 there.

Figure 2:
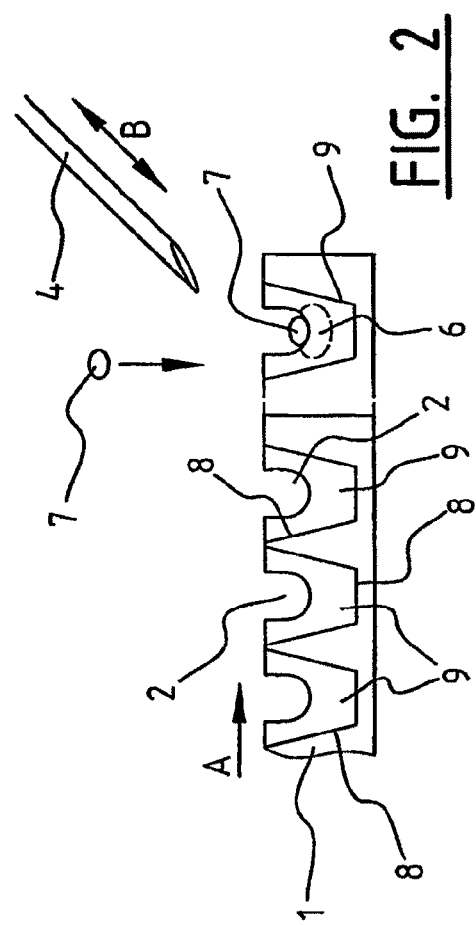
FIG. 2 shows a cross-sectional view along the line II-II in FIG. 1.

As also shown in FIG. 2, tray 1 is displaced in the direction of arrow A. (Rows of) plant locations 2 herein move in each case under injectors 4 or at least in line with the direction of movement of injectors 4 schematically designated with double arrow B. By driving injectors 4 reciprocally in the direction of double arrow B treatment agent 6 can be injected into plugs 9, preferably precisely below plant locations 2. Using release elements 5 seeds are deposited simultaneously, or earlier or later, in plant locations 2. Injectors 4 for treatment agent 6 and release elements 5 for seeds are located some distance relative to each other in the direction of movement of arrow A. This must be taken into account when it is desired that treatment agent 6 and a seed 7 come to lie successively or simultaneously in one of the plant locations 2. The drop speed and air resistance of seeds 7 can also be taken into account here in order to have injectors 4 and release elements 5 driven by means of a control on the basis of these differences in position between release elements 5 and plant locations 2 and drop characteristics of seeds 7. In the thus shown embodiment treatment agent 6 is first injected into a plant location 2 formed by a hole in plugs 9, followed by a seed 7. It is however possible, taking into account for instance legislation, etc., to reverse this sequence. Seed 7 is then deposited first, followed by injection of treatment agent 6, so that there is or can be no pretreatment of plugs 9 prior to depositing of seed 7.

A highly automated process is possible with the present invention, which is very favourable from a cost viewpoint, without it being necessary for pre-coated seeds 7, which are relatively expensive, to be purchased or treatment agent 6 being wasted, which could occur with spraying or dripping of treatment agent 6. According to the invention account is taken of the positional differences of particularly the release elements 5 relative to the plant locations and the differences in the drop characteristics and paths of the individual sowing and/or plantable material, for instance seeds, cuttings, etc. By taking all these factors into account it is possible to effect with certainty that sufficient, but not too much, treatment agent 6 is injected into each plant location 2 in combination with sowing and/or plantable material.

Figure 3:
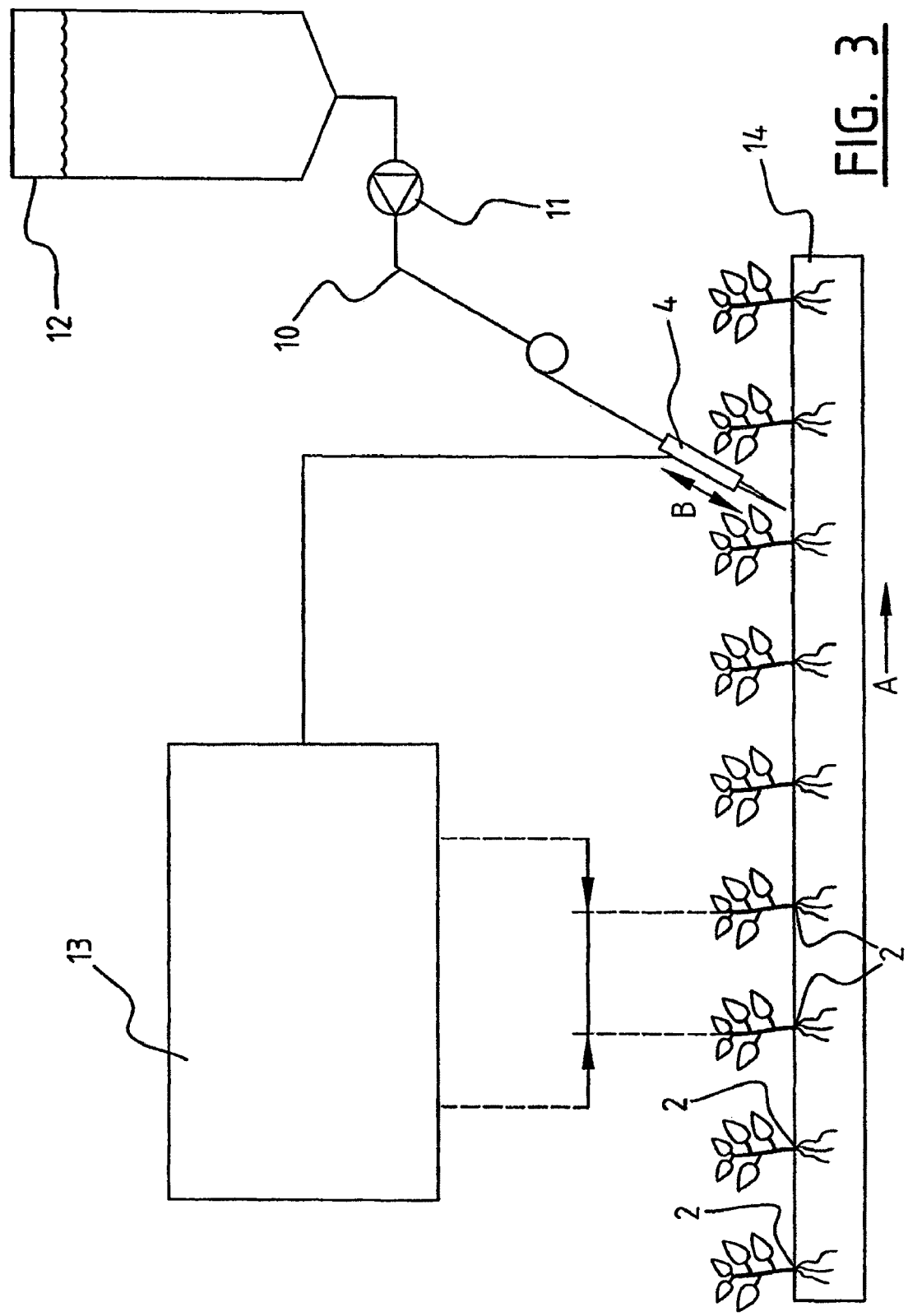
FIG. 3 shows schematically a side view of another embodiment of the invention.

A substrate mat 14 is used in the embodiment of FIG. 3. Plant locations 2, where cultivation of plants 15 takes place, are distributed over the surface of substrate mat 14. Plants 15 are shown in FIG. 3, but it is also possible within the scope of the invention for plants 15 to be planted or set at or close to the point in time at which injectors 4 act on substrate mat 14. In a favourable embodiment plants 15 can already have been planted in or on substrate mat 14 for some time before the injection. Treatment agent 6 can thus still be administered to plants 15 after they have been kept for some time and before they are exposed to possibly harmful influences, for instance when the tray or substrate mat 14 with the plants 15 grown therein is delivered by a grower to a market gardener.

A measuring module 13 is herein provided which indicates when plant locations 2 are situated close to an injector 4. At the correct moment, this moment being determined or prompted by measuring module 13 or another embodiment of a control, injector 4 injects a precise quantity of treatment agent 6 into substrate mat 14, in which plant locations 2 are defined, at some distance beneath the surface thereof. The agent comes from a reservoir 12 and is carried to injectors 4 via a conduit 10 having a pump 11 therein. At a correct or desired alignment of injector 4 relative to plant location 2 the injector 4 is moved reciprocally by a drive (not shown) in the direction of double arrow B, preferably under the control of measuring module 13 or another type of control. The timing particularly is of crucial importance when substrate mat 14 and injector 4 move relative to each other, this being designated in the figure with arrow A.

Many alternative and additional embodiments will occur to the skilled person after examination of the foregoing, all of which fall within the scope of protection according to the appended claims unless such embodiments depart from the letter or spirit of these claims. Rows 3 can thus comprise individual soil blocks. The plant locations are then formed in the individual soil blocks. Each soil block can then be deemed in each case as one substrate with a single plant location.

It can also be possible for injectors 4 and/or release elements 5 for specimens of the sowing and/or plantable material to be not oriented exactly downward. Droplets with treatment agent 6 may also be "fired" into plugs 9 and injected into, under or close to plant locations 2, before seed 7 lands in a plant location 2. Injectors 4 and release elements 5 can also be combined in order to inject treatment agent 6 into plugs 9 at roughly the time of release of in any case one specimen of the sowing and/or plantable material. The time taken for injecting and depositing can thus be minimized. Release elements 5 then for instance co-displace up and downward with injectors 4. It may also be preferred in some conditions to deposit the seed 7 first, and follow with injection of treatment agent 6.

A greater distance than that shown can be provided between injectors 4 and release elements 5. The control of injectors 4 and release elements 5 is then not so much aimed at synchronizing depositing of seed 7 at a plant location corresponding to the injection of treatment agent 6 in a for instance almost simultaneous manner. The synchronization is then of a type wherein a distance traveled by the plant location between injection of treatment agent 6 and depositing of seed 7 is taken into account.

Injection can also be applied when seed 7 has already been sown or when cuttings, plants or seedlings have already been set or planted or when the plant is already developing, for instance at the moment when the young plants are ready to be supplied by the plant grower to the market gardener. Injection can also taken place into a plant, seedling or cutting.

The invention claimed is:

1. A method for administering at least one substance acting as treatment agent to plant material, comprising of:
    a) providing at least one substrate with a surface and at least one plant location therein;
    b) providing injecting means;
    c) moving the substrate and the injection means relative to each other;
    d) controlling an alignment of the injecting means relative to the plant location; and
    e) injecting the substance at the position of the plant location using the injecting means.

2. The method as claimed in claim 1, further comprising of sowing, setting or planting the plant material on or in the substrate at the plant location prior to, during or after injection.

3. The method as claimed in claim 1, further comprising of providing a series of substrates, at least a series of plant locations in a direction corresponding to the forward movement, and successively aligning the injecting means at the plant locations and repeatedly injecting the substance at discrete moments during the movement.

4. The method as claimed in claim 3, further comprising of interrupting the forward movement at least during injection.

5. The method as claimed in claim 1, wherein the substance is one from the group comprising of fungicide, pesticide, plant growth enhancer, bacteria, insecticides, herbicides, and nematocides.

6. The method as claimed in claim 1, wherein the plant material is one from the group comprising of cuttings, seeds, seedlings, and plants.

7. The method as claimed in claim 1, wherein the substrate is at least one from the group comprising of a plate-like material such as rockwool fibres, potting compost, coconut (fibres), plugs, soil blocks.

8. A device for administering to a plant or plant material at least one substance, said device being arranged to process a substrate with a surface and at least one plant location therein, the device comprising:
   a) at least one injector to inject the substance at the position of the plant location;
   b) transport means to move the substrate and the injection means relative to each other;
   c) a controller for controlling an alignment of the injector relative to the plant location prior to injecting the substance.

9. A method for administering to a plant or plant material at least one substance, comprising:
   (a) providing at least one substrate with a surface and at least one plant location therein;
   (b) providing injecting means;
   (c) moving the substrate and the injection means relative to each other;
   (d) controlling an alignment of the injecting means relative to the plant location; and
   (e) injecting the substance at the position of the plant location or to the plant or plant material using the injecting means,
   characterized by providing a measuring module arranged to indicate when the at least one plant location, plant or plant material is situated close to the injecting means, and by determining a correct moment by said measuring module or another embodiment of a control for said injecting of the substance.

10. The method according to claim 9, further comprising sowing, setting or planting the plant or plant material on or in the substrate at the plant location prior to, during or after injection.

11. The method according to claim 9, further comprising providing a series of substrates, at least a series of plant locations in a direction corresponding to the forward movement, and successively aligning the injecting means at the plant locations and repeatedly injecting the substance at discrete moments during the movement.

12. The method according to claim 11, further comprising interrupting the forward movement at least during injection.

13. The method according to claim 9, wherein the substance is selected from the group consisting of fungicide, pesticide, plant growth enhancer, bacteria, insecticides, herbicides, nematocides, treatment agents, and plant seeds.

14. The method according to claim 9, wherein the plant material is selected from the group consisting of plant cuttings, seeds, seedlings, and plants.

15. The method according to claim 9, wherein the substrate is selected from the group consisting of a plate-like material such as rockwool fibers, potting compost, coconut (fibers), plugs, soil, dirt, cultivated soil, soil blocks, bark, artificial planting material and any mixture thereof.

16. The method according to claim 9, wherein said substance is injected under said surface or into said plant or plant material from above said surface or said plant or plant material.

17. A device for administering to a plant or plant material at least one substance, said device being arranged to process a substrate with a surface and at least one plant location therein, said device comprising:
   a) at least one injector to inject the substance at the position of the plant location; and
   (b) transport means to move the substrate and the at least one injector relative to each other;
   characterized in that said device further comprises a measuring module arranged to indicate when the at least one plant location is close to the injector, wherein said measuring module or another embodiment of a control is arranged to determine the correct moment for the injector to inject the substance into the substrate.

18. The device according to claim 17, characterized by at least one release element for depositing a seed in the at least one plant location.

19. The device according to claim 18, characterized in that the at least one injector and at least one release element are stationary and the transport means are arranged to displace the substrate.

20. The device according to claim 18, characterized in that the at least one injector and at least one release element are disposed for travel on a frame and the substrate is stationary.

21. The device according to claim 17, wherein the substance is selected from the group consisting of fungicide, pesticide, plant growth enhancer, bacteria, insecticides, herbicides, nematocides and plant seeds.

22. The method according to claim 17, wherein the plant material is selected from the group consisting of plant cuttings, seeds, seedlings, and plants.

23. The method according to claim 17, wherein the substrate is selected from the group consisting of a plate-like material such as rockwool fibers, potting compost, coconut (fibers), plugs, soil, dirt, cultivated soil, soil blocks, bark, artificial planting material and any mixture thereof.

24. The device of claim 17, wherein said at least one injector is arranged to inject said substance under said surface from above said surface.

* * * * *